(12) United States Patent
Ward et al.

(10) Patent No.: US 6,784,924 B2
(45) Date of Patent: Aug. 31, 2004

(54) NETWORK CONFIGURATION FILE FOR AUTOMATICALLY TRANSMITTING IMAGES FROM AN ELECTRONIC STILL CAMERA

(75) Inventors: Joseph Ward, Hilton, NY (US); Kenneth A. Parulski, Rochester, NY (US); James D. Allen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/004,046

(22) Filed: Jan. 7, 1998

(65) Prior Publication Data

US 2003/0142215 A1 Jul. 31, 2003

Related U.S. Application Data

(60) Provisional application No. 60/037,963, filed on Feb. 20, 1997, and provisional application No. 60/037,962, filed on Feb. 20, 1997.

(51) Int. Cl.[7] ............................................... H04N 5/225
(52) U.S. Cl. ................................. 348/207.1; 348/211.3
(58) Field of Search ............................. 348/207, 211, 348/212, 213, 231, 232, 233, 552, 239, 211.99–211.13, 211.3, 17; 710/62, 3, 8; 345/327; 386/48, 117; 725/131–133, 139–141, 151–153; 709/217–219, 220; 705/26, 27; 455/566

(56) References Cited

U.S. PATENT DOCUMENTS

| | | |
|---|---|---|
| 4,524,381 A | 6/1985 | Konishi |
| 4,574,319 A | 3/1986 | Konishi |
| 4,825,457 A | 4/1989 | Lebowitz |
| 5,241,659 A | 8/1993 | Parulski et al. |
| 5,477,264 A | 12/1995 | Sarbadhikari et al. |
| 5,606,365 A | 2/1997 | Maurinus et al. |
| 5,663,678 A | 9/1997 | Chang |
| 5,666,159 A | 9/1997 | Parulski et al. |
| 5,737,491 A * | 4/1998 | Allen et al. .................. 704/270 |
| 5,806,005 A * | 9/1998 | Hull et al. ................... 455/566 |
| 5,825,432 A * | 10/1998 | Yonezawa .................... 348/563 |
| 6,111,604 A * | 8/2000 | Hashimoto et al. ......... 348/220 |
| 6,122,005 A * | 9/2000 | Sasaki et al. ............ 348/211.3 |
| 6,166,729 A * | 12/2000 | Acosta et al. ................ 345/719 |
| 6,449,001 B1 * | 9/2002 | Levy et al. ............... 348/14.04 |

OTHER PUBLICATIONS

User's Manual—Axis 2420 Network Camera, 1996 (Axis Comminications).*
U.S. patent application Ser. No. 60/037,963, Parulski et al.
"The Universe of Smart Cards: EasySIM software", Schlumberger Limited.
"Claris Emailer" from Claris' home page on internet.
"Kodak Professional Digital Camera System—User's Manual," Eastman Kodak Company, 1991–1992, pp. x to xv, 2–1 to 2–3, 3–29 to 3–30, and 4–1 to 4–49.

* cited by examiner

Primary Examiner—Tuan Ho
(74) Attorney, Agent, or Firm—Pamela R. Crocker

(57) ABSTRACT

A network configuration file is generated at a host computer and downloaded to a digital camera. This file contains instruction information for communicating with a selected destination via a communications interface. The digital camera includes a "send" button or LCD icon which allows the user to easily transmit one or more images via a wired or wireless communications interface to a desired destination, which among other possibilities may be an Internet Service Provider or a digital photofinishing center. When the user selects this option, the communications port settings, user account specifics, and destination connection commands are read from the network configuration file on the removable memory card. Examples of these settings include serial port baud rate, parity, and stop bits, as well as account name and password.

9 Claims, 4 Drawing Sheets

FIG. 3

| IMAGE HEADER | TRANSMISSION TYPE TAGS | IMAGE DATA |
|---|---|---|

FIG. 4A

PHONE (PUBLIC SWITCHED TELEPHONE NETWORK)

| PROTOCOL TYPE | PHONE NUMBER | DEFAULT SETTINGS | MODEM CONTROL STRING | ACCOUNT DATA | PASSWORD | SYSTEM COMMANDS |
|---|---|---|---|---|---|---|

CELLULAR OR PCS

| PROTOCOL TYPE | PHONE NUMBER | DEFAULT SETTINGS | MODEM CONTROL STRING | ACCOUNT DATA | PASSWORD | SYSTEM COMMANDS | ERROR PROTOCOL | RADIO TYPE |
|---|---|---|---|---|---|---|---|---|

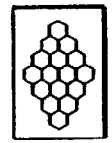

WIRELESS LAN

| PROTOCOL TYPE | PHONE NUMBER | DEFAULT SETTINGS | PARA-METER FILE | ACCOUNT DATA | PASSWORD | SYSTEM COMMANDS |
|---|---|---|---|---|---|---|

| FIG.4A |
|---|
| FIG.4B |

FIG. 4

NETWORK CONFIGURATION FILE FOR AUTOMATICALLY TRANSMITTING IMAGES FROM AN ELECTRONIC STILL CAMERA

CROSS-REFERENCE TO RELATED APPLICATION(S)

THIS APPLICATION CLAIMS BENEFIT OF PROVISIONAL APPLICATION SERIAL No. 60/037,962 FILED Feb. 20, 1997.

Reference is made to commonly assigned copending applications Serial No. 60/037,963, filed Feb. 20, 1997 entitled "Electronic Camera with 'Utilization' Selection Capability" and filed in the names of Kenneth A. Parulski, Joseph Ward, and Michael C. Hopwood, which is assigned to the assignee of this application.

FIELD OF THE INVENTION

The invention relates generally to the field of photography, and in particular to electronic photography. More specifically, the invention relates to a digital camera that interfaces with a host computer.

BACKGROUND OF THE INVENTION

Digital cameras, such as the Kodak Digital Science DC25™ camera, allow images to be utilized on a home computer (PC) and to be incorporated into e-mail documents and personal home pages on the World Wide Web. Presently, images must be copied to the PC and transmitted as e-mail, for example using an online service or an Internet Service Provider (ISP), via a modem from the user's PC. It would be desirable to be able to transmit pictures directly from the digital camera instead of first transferring the pictures to a PC. For instance, on a vacation trip, it is desirable to immediately share pictures with friends or relatives via e-mail or Internet access. It is also desirable to transmit pictures from a location without PC access in order to free up camera storage to take additional pictures. There are a wide variety of connection means to online services such as America On Line, ISPs, and bulletin board services. Each of these services typically requires an account name and password, as well as local telephone access numbers, and specific communications settings. It would be difficult to provide an easy-to-use means with buttons or menus on a small digital camera to input and/or modify all of these required settings.

SUMMARY OF THE INVENTION

The present invention is directed to overcoming one or more of the problems set forth above. Briefly summarized, according to one aspect of the present invention, a network configuration file is generated at a host computer and downloaded to a digital camera. This file contains instruction information for communicating with a selected destination via a communications interface. The digital camera includes a "send" button or LCD icon which allows the user to easily transmit one or more images via a wired or wireless communications interface to a desired destination, which among other possibilities may be an Internet Service Provider or a digital photofinishing center. When the user selects this option, the communications port settings, user account specifics, and destination connection commands are read from the network configuration file. Examples of these settings include serial port baud rate, parity, and stop bits, as well as account name and password.

In addition, information about which image or images to transmit is entered using the user buttons on the digital camera. This information is used to automatically establish a connection, log-in to the desired destination, and to transmit the image. The transmission may occur immediately after the pictures are taken, for example if the camera has a built-in cellular phone modem, or at a later time, when the camera is connected to a separate unit (such as a dock, kiosk, PC, etc.) equipped with a modem. In the latter case, a "utilization file" is created to provide information on which images should be transmitted to which account.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 is a diagram of an image file.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art. Some aspects of the present description may be implemented in software. Unless otherwise specified, all software implementation is conventional and within the ordinary skill in the programming arts.

Figure 1:
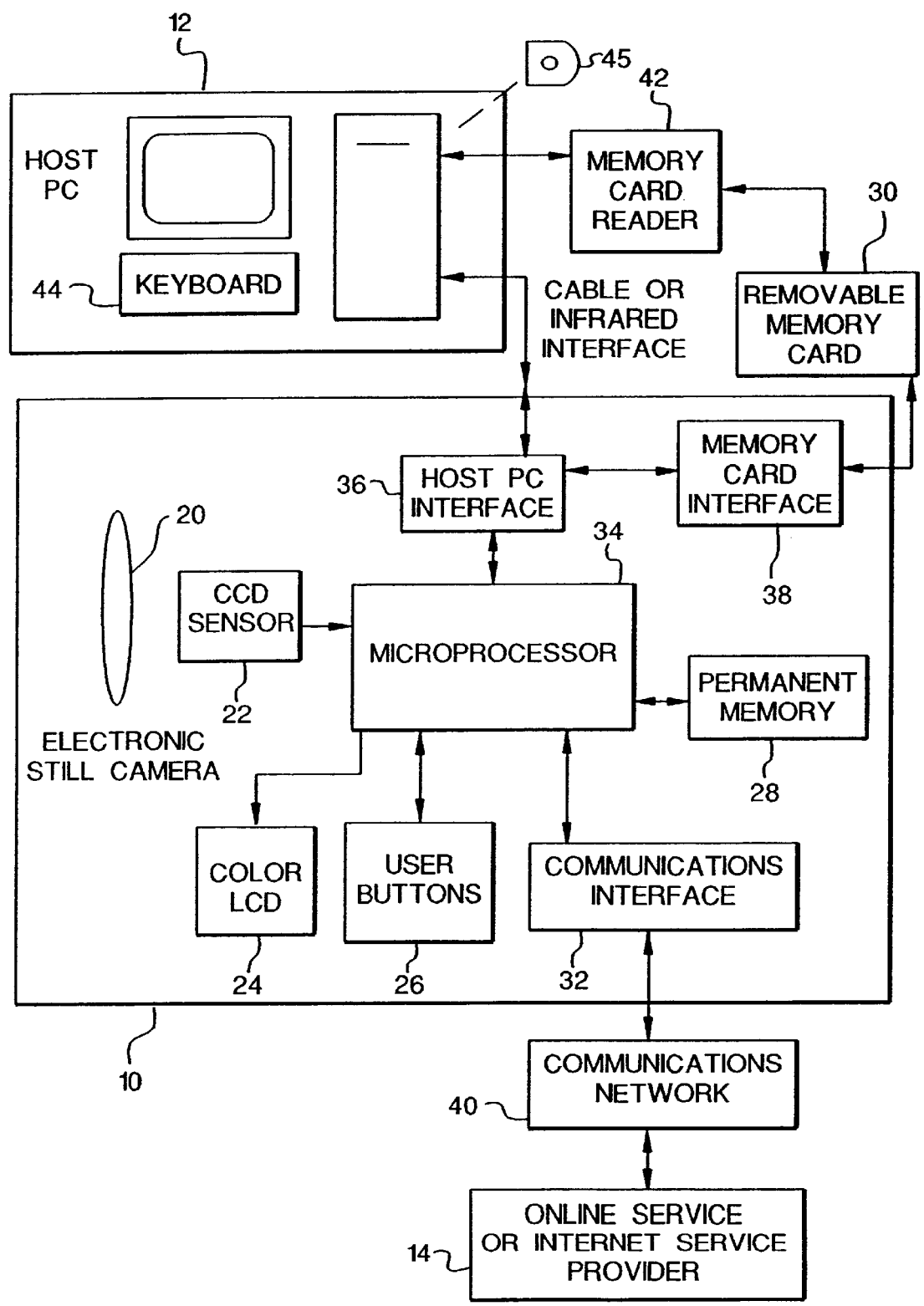
FIG. 1 is a system block diagram of the invention.

A system block diagram of the invention is shown in FIG. 1 including an electronic still camera 10, a host computer (PC) 12 and a service provider 14. The camera includes an optical section 20 for imaging a scene upon a CCD sensor 22 and generating an image signal, a liquid crystal display (LCD) 24 for displaying images and other information, a number of user input buttons 26, both permanent memory 28 and removable memory 30, and an internal communications interface 32 (e.g., modem). This interface may connect to a variety of known networks, such as a public switched telephone network (PSTN), ISDN, an RF cellular phone network, or Ethernet. The camera 10 also includes a microprocessor 34 for generally controlling the camera functions, as well as the interchange of data with the host PC 12 and the memory card 30 through a host PC interface 36 and a memory card interface 38, respectively. Besides the host PC 12, the system includes a network connection 40 to the online service or ISP (Internet Service Provider) 14. Alternately, the network 40 can connect to the user's home PC 12.

When the camera 10 is first purchased (or at any time thereafter), it is connected to the PC 12 via the host PC 36 interface and a software application (stored on a disc 45) running on the host PC 12 will enable the user to specify the name of a destination ISP or online service and to input from the host PC keyboard 44 the appropriate communication settings and account information. This information generates a network configuration file, which then can then be downloaded to the camera 10 through the host PC interface 36, which may be a wired or infrared (e.g., IrDA) interface, and written to the camera's internal memory 28 and/or the removable memory card 30. Alternatively, a host PC equipped with a memory card reader/writer 42 can write the information directly to the card 30 without connecting the camera through its host PC interface 36. Also, this information could be predetermined by the user and stored in a "preferences" file on the host PC 12 and then transferred to the camera 10 from this file without further intervention by the user. Multiple sets of destination services can be stored on the memory card 30. Typically, keyword or graphic descriptors (e.g., icons) accompany the information in the network configuration file about destination services to enable easy access by the camera user.

Figure 2:
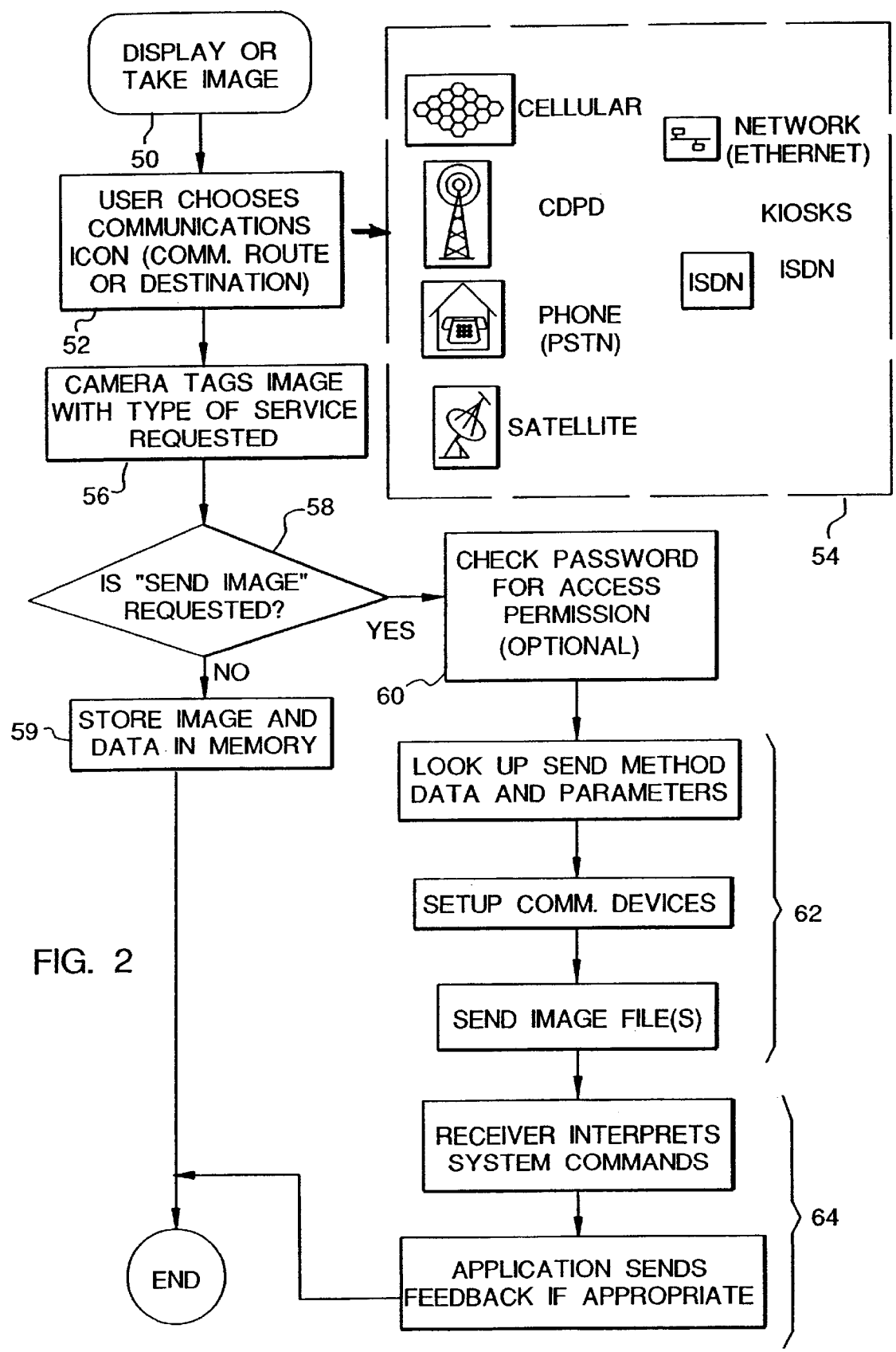
FIG. 2 is a diagram showing the steps used to automatically transmit images using the network configuration file.

The steps used to automatically transmit images using the network configuration file are shown in FIG. 2. After disconnecting the camera from the host PC, the user operates the camera to take pictures (step 50). This is typically done at a remote location, for example while traveling to another city. As the user takes or reviews images on the image LCD display, the decision can be made to transmit one or more images (step 52). This is done by choosing one of the keywords or icons in a menu 54 shown in FIG. 2, which are displayed on the LCD 24 and selected, e.g., through the user buttons 26. (Note that a camera will typically only include a subset (only those desired by the user) of all the different services shown.) The selected image files may be tagged with a code (step 56) indicating which service is requested, as shown in FIG. 3. (Alternately, an "image utilization" file can be created in the camera storing a list of images to be transmitted by a particular method, as described in the cross-referenced copending patent application (U.S. Serial No. 60/037,963). As described in that patent application, the details of an order, e.g., number of print copies to be made from an image and the size of the prints and/or a list of images to be e-mailed to various recipients, is written into the "utilization" file, which identifies the order and includes pointers to the image files that store the images required to "fulfill" the order. The "utilization" file is stored in the internal memory 28 or the memory card 30.)

Figure 4B:
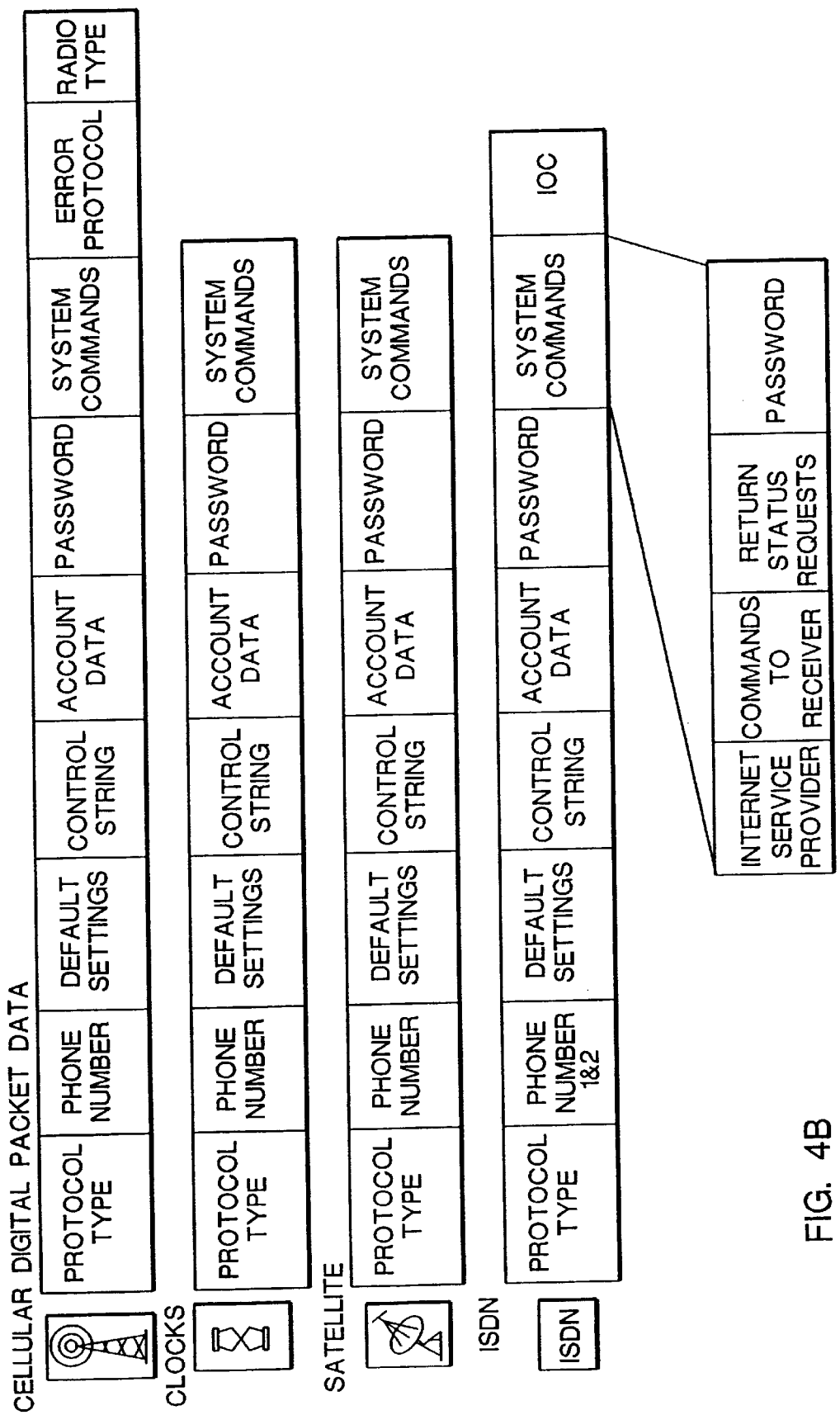
FIG. 4 is a diagram showing several versions of the network configuration file.

Next, the system determines whether a request exists to send an image (step 58). If no request is present, the image and associated data is stored in either permanent memory 28 or the memory card 30 (step 59). (Typically, all images are initially saved in memory whether eventually sent or not.) Otherwise, if there is a request to send an image, the user ensures that the camera is connected to the appropriate service (wired telephone line, cellular phone, kiosk, etc.) and pushes a "send" button in the user button section 26, or selects a "send" menu option on the LCD 24. The camera then utilizes the appropriate network configuration file, shown in FIG. 4. Each network configuration file contains items such as the protocol type, phone number, etc., as described in Appendix I. The user password may be checked against the password in the network configuration file to ensure that the user is authorized to connect the camera to the desired service (step 60). Alternately, the stored password in the appropriate configuration file can be used. Next, the camera uses the parameters in the configuration file to establish communications with the service and send one or more image files as selected by the user (steps 62). The service receiver interprets the system commands issued by the camera from the network configuration file list and sends appropriate feedback (such as "transfer in progress" and "transfer complete") which are interpreted by the camera and displayed on the LCD 24 (steps 64).

For example, when the camera uses a normal wired telephone (Public Switched Telephone Network) connection (i.e., network 40) to the camera's internal modem 32, after the user selects the images to be sent and presses the "send" button, the camera performs the following steps without user intervention:

1) Read the appropriate connection parameters from the network configuration file (on the memory card 30 or internal camera memory 28), dial the phone and establish the connection to the destination service 14.
2) Read the user's account name and password and transmit these to "log-on" to the service 14.
3) Using the appropriate communications protocol (FTP, mailto, etc.), transmit the selected image or images to the destination service 14.

The invention has been described with reference to a preferred embodiment. However, it will be appreciated that variations and modifications can be effected by a person of ordinary skill in the art without departing from the scope of the invention.

Appendix I

These are descriptions of the tags listed in the previous drawing:

Protocol Type

Each communication method has its own protocol, or rules to communicate. This tag identifies that protocol and where to find it. For example, the Network may use TCP/IP and a modem may use XModem.

Phone Number

This is the number of the receiving service. If internet access is requested, this could be the number of the Internet Service Provider. For ISDN, some systems require two phone numbers, dialed and connected to in sequence.

Default Settings

Standard settings that make the communications device compatible with the imaging device.

Modem Control String

Modem and communications devices have a command language that can set them up before they are used. For example, modems have many options controlled by command strings including volume level, the amount of time the carrier is allowed to fail before the system hangs up, and so on.

Account Data

This can be internet account data, charge number data, phone card data, billing address, and data related to the commerce part of the transmission.

Password

Any password needed to get into the communications system. Other passwords to get into the remote application or destination are located in the System Commands section.

System Commands

These are commands that control the end destination.

Error Protocol

In cellular and some other wireless communications, error protocols are used to increase the robustness of the link. For example, MNP10 or ETC may be used for cellular links.

Radio Type

The type of radio used for this communications feature may be identified here. Some cell phones have modems built in, others will have protocols for many communications functions built in. The radio type will make the imaging device adapt to the correct interface.

IOC

ISDN Ordering Code identifies what features are available on the ISDN line provided by the teleco. It is used to establish the feature set for that communications link.

Internet Service Provider

This identifies the actual service provider and any specific information or sequence of information that the service wants to see during connection and logoff. It also tells the device how to handle the return messages, like "time used" that are returned by the server.

Commands to Receiver

This may be a list of commands to control the receiving application. For example, a command to print one of the images and save the data to a particular file on a PC may be embedded here.

Return Status Requests

This tag can set up the ability of the application to tell if an error has occurred, or what the status of the application might be. The data here will help the device decide if it should continue communicating and a set user interface response can be developed around this feedback.

What is claimed is:

1. A method for directing the automatic transmission of images from an electronic camera, said method including the steps of:

storing network configuration information in a memory of the electronic camera;

using the network configuration information to connect the camera to an online service or internet service provider (ISP);

transferring pictures and data from the camera to the online service or ISP;

receiving information from the online service or ISP indicating that the transfer of the pictures and data is complete; and displaying information on a display of the electronic camera indicating that the transfer of the pictures and data is complete;

wherein the network configuration information is generated at least in part in a host device adaptable for communication with the electronic camera, based on information previously stored in the host device and utilizable to connect the host device to the online service or ISP.

2. The method as claimed in claim 1 wherein the connection between the camera and the online service or ISP includes a PSTN (Public Switched Telephone Network).

3. The method as claimed in claim 1 wherein the connection between the camera and the online service or ISP includes an ISDN network.

4. The method as claimed in claim 1 wherein the connection between the camera and the online service or ISP includes an RF cellular phone network.

5. The method as claimed in claim 1 wherein the connection between the camera and the online service or ISP includes an Ethernet connection.

6. The method of claim 1 wherein the information previously stored in the host device comprises information stored in a network configuration preference file of the host device.

7. A method for directing the automatic transmission of images from an electronic camera, said method including the steps of:

storing network configuration information in a memory of the electronic camera, the network configuration information comprising information for using a communications network to establish a connection between the electronic camera and an online service or internet service provider (ISP); and in response to user activation in the electronic camera of a transmission command specifying one or more pictures for transmission, automatically performing without further user intervention the steps of:

retrieving the stored network configuration information;

utilizing the retrieved information to establish a connection between the electronic camera and the online service or ISP;

transferring the one or more pictures from the electronic camera to the online service or ISP;

receiving information from the online service or ISP indicating that the transfer of the one or more pictures is complete; and displaying the information on a display of the electronic camera indicating that the transfer of the one or more pictures is complete;

wherein the network configuration information is generated at least in part in a host device based on information previously stored in the host device, and the generated network configuration information is subsequently downloaded from the host device into the electronic camera in conjunction with the storming step.

8. The method of claim 7 wherein the host device comprises a personal computer.

9. The method of claim 7 wherein the information previously stored in the host device comprises information stored in a network configuration preference file of the host device.

* * * * *